(12) United States Patent
Ryzhkov

(10) Patent No.: US 7,244,408 B2
(45) Date of Patent: Jul. 17, 2007

(54) SHORT CARBON NANOTUBES

(75) Inventor: Vladislav Andreevitch Ryzhkov, Limassol (CY)

(73) Assignee: Rosseter Holdings Limited, Limassol (CY)

( * ) Notice: Subject to any disclaimer, the term of this patent is extended or adjusted under 35 U.S.C. 154(b) by 236 days.

(21) Appl. No.: 10/490,606

(22) PCT Filed: Sep. 30, 2002

(86) PCT No.: PCT/GB02/04404

§ 371 (c)(1),
(2), (4) Date: Mar. 24, 2004

(87) PCT Pub. No.: WO03/029141

PCT Pub. Date: Apr. 10, 2003

(65) Prior Publication Data

US 2004/0241077 A1    Dec. 2, 2004

(30) Foreign Application Priority Data

Oct. 1, 2001 (GB) ................................ 0123508.4
Mar. 19, 2002 (GB) ................................ 0206442.6

(51) Int. Cl.
*D01F 9/12* (2006.01)
(52) U.S. Cl. .................... 423/447.2; 977/752
(58) Field of Classification Search ............ 423/447.1, 423/447.2; 977/742, 750, 752, 842
See application file for complete search history.

(56) References Cited

U.S. PATENT DOCUMENTS 5,424,054 A    6/1995   Bethune et al.

2002/0112814 A1*  8/2002  Hafner et al. ............ 156/272.2

FOREIGN PATENT DOCUMENTS

| EP | 1 022 763 A1 | 7/2000 | |
|---|---|---|---|
| EP | 1 129 990 A1 | 9/2001 | |
| GB | WO 01/16023 A1 * | 3/2001 | ........... 423/447.2 |
| WO | PCT/US99/13648 | 12/1999 | |
| WO | PCT/EP00/08424 | 3/2001 | |

OTHER PUBLICATIONS

Kiang, Ching-Hwa, et al., "Carbon Nanotubes with Single-Layer Walls," 1994, Pergamon, Carbon, vol. 33, No. 7, pp. 903-914.*
Liu, J., et al., "Fullerene Pipes," May 22, 1994, American Association for the Advancement of Science, Science, vol. 280, pp. 1253-1256.*
Nikolaev, P., et al., "Diameter Doubling of Single-Wall Nanotubes," Mar. 7, 1997, Elsevier, Chemical Physics Letters, vol. 266, pp. 422-426.*

(Continued)

*Primary Examiner*—Stuart L. Hendrickson
*Assistant Examiner*—Daniel C. McCracken
(74) *Attorney, Agent, or Firm*—Thompson Coburn LLP

(57) ABSTRACT

There is provided shorte nanotubes and nanoparticles. The nanotubes are in general terms shorter than conventionally produced nanotubes. An improved apparatus for production of the fullerenes and nanocarbons is also disclosed wherein a moveable contactor is attached to a first electrode within a sealable chamber, and is spaced from the second electrode such that an electric discharge can pass between them.

9 Claims, 6 Drawing Sheets

OTHER PUBLICATIONS

Seraphin, S., et al., "Single-Walled Carbon Nanotubes Produced at High Yield by Mixed Catalysts," Apr. 18, 1994, American Institute of Physics, Applied Physics Letters, vol. 64, No. 16, pp. 20-22.*

Seraphin, S., et al., "Effect of Processing Conditions on the Morphology and Yield of Carbon Nanotubes," 1993, Pergamon Press Ltd., Carbon, vol. 31, No. 5, pp. 685-689.*

Bonard, Jean-Marc, et al., "Why are Carbon Nanotubes such Excellent Field Emitters," Nov. 10, 1998, Foresight Institute, Sixth Foresight Conference on Molecular Nanotechnology, pp. 1-11.*

PCT *Notification of Transmittal of the International Search Report or the Declaration* dated Oct. 2, 2003; Application No. PCT/GB02/04404; Applicant: Rosseter Holdings Ltd.; Filing Date: Mar. 9, 2002.

PCT *Notification of Transmittal of The International Preliminary Examination Report* dated Oct. 16, 2003; Application No. PCT/GB02/04404; Applicant: Rosseter Holdings Ltd.; Filing Date: Mar. 9, 2002.

Carbon Nanotubes with Single-Layer Walls; Authors: Ching-Haw Kiang, William A. Goddard III, Robert Beyers, and Donald S. Bethune; *Elsevier Science Publishing*, p. 903-914; Aug. 1995.

Fullerene Pipes; Authors: Jie Liu, Andres G. Rinzler, et al.; *Science, American Association for the Advancement of Science*, vol. 280, pp. 1253-1256; May 22, 1998.

Diameter Doubling of Single-Wall Nanotubes; Authors: Pavel Nikolaev, Andras Thess, et al.; *Elsevier Science Publishing: Chemical Physics Letters* vol. 166 (1997), p. 422-426; Mar. 7, 1997.

Bulk Morphology and Diameter Distribution of Single-Walled Carbon Nanotubes Synthesized by Catalytic Decomposition of Hydrocarbons; Authors: H.M. Cheng, F.Li, et al.; *Elsevier Science Publishing: Chemical Physics Letters* vol. 289 (1998), p. 602-610; Jun. 19, 1998.

Single-Walled Carbon Nanotubes Produced at High Yield by Mixed Catalysts; Authors: Supapan Seraphin and Dan Zhou; *American Institute of Physics: Applied Physics Letters 320* vol. 64 (1994); Apr. 18, 1994.

Single-Walled Carbon Nanotubes Growing Radially From $YC_2$ Particles; Authors: Dan Zhou, Supapan Seraphin and Su Wang, *American Institute of Physics: Applied Physics Letters 320* vol. 65 (1994), p. 1593-1595; Sep. 19, 1994.

* cited by examiner

SHORT CARBON NANOTUBES

APPLICATION CROSS-REFERENCES

This application claims priority of International Application No. PCT/GB02/04404 filed Sep. 30, 2002 and published in English. This application also claims priority of Great Britain Patent No. 0123508.4, filed Oct. 1, 2001 and of Great Britain Patent No. 0206442.6, filed Mar. 19, 2002.

The present invention relates to the production of new carbon allotropes, namely carbon nanotubes.

Carbon nanotubes are fullerene-like structures, which consist of cylinders closed at either end with caps containing pentagonal rings. Nanotubes were discovered in 1991 by Iijima [1] as being comprised of the material deposited in the cathode during the arc evaporation of graphite electrodes. Nanotubes have now been recognised as having desirable properties which can be utilised in the electronics industry, in material and strengthening, in research and in energy production (for example for hydrogen storage). However, production of nanotubes on a commercial scale still poses difficulties.

Methods of producing nanotubes described in the literature depend upon the vaporisation of carbon sources.

Further, single Wall Nano Tubes (SWNTs) produced by laser ablation [2] of carbonaceous targets mixed with metallic catalysts (usually, Co and Ni) typically have rope-like structures of undefined length and diameters of 1-1.4 nm. Thus for some applications it is required to cut SWNTs to shorter (100-400 nm in length) pieces [3].

SWNTs produced by an electric arc discharge between graphite electrodes containing metallic catalysts such as Ni and Y have bigger mean diameters of 1.8 nm and unlimited lengths [4].

Multi Wall Nano Tubes (MWNTs) typically have several concentrically arranged nanotubes within the one structure have been reported as having lengths up to 1 mm, although typically exhibit lengths of 1 micrometres to 10 micrometres and diameters of 1-100 micrometers and diameters of 2-20 nm [1]. All of the methods described in the literature to date report nanotubes of these dimensions.

We have now discovered a methodology which produces shortened nanotubes (sh-NTs), making these nanotubes more suitable for certain applications.

The shortened nanotubes of the present invention fall within the following dimensions:

In accordance with a first aspect of the present invention there is provided shortened SWNTs (sh-SWNTs) having diameters distributed in the range 2-5 nm. Preferably, the sh-SWNTs have diameters in the range 2-3 nm.

Preferably, the sh-SWNTs have lengths in the range 0.1 to 1 mictometers. More preferably, the shortened nanotubes have lengths in the range 0.1 to 0.5 micrometers.

Consequently, the sh-SWNTs of the present invention are much shorter in length, but are of wider diameter than conventional SWNTs.

In accordance with a second aspect of the present invention these is provided shortened Multi-walled nanotubes (sh-MWNTs) having a mean diameter of 2 to 15 nm and a length of between 50 and 1000 nm.

Preferably, the sh-MWNTs have a median value of 60-80 Angstroms and a length of 100-500 nm.

Preferably, the sh-MWNTs are constructed from 2 to 15 layers of SWNT, usually 5 or 7 layers of SWNT.

Thus, the sh-MWNTs according to the present invention are much shorter than those previously described in the literature.

Powder samples of the sh-MWNTs and sh-SWNTs demonstrate relatively high electron emission at low electric fields of the order of 3-4V/micrometer. Electron emission starts at about 2V/micrometer in sh-MWNT samples.

Unexpectedly, we have found that opening a single end of our novel nanotubes is easier to perform than in respect of existing conventional nanotubes.

Additionally resealing the nanotubes of the present invention is simpler to perform than with conventional nanotubes.

The nanotubes according to the present invention may be produced using the methodology of our co-pending Application PCT/GB2002/004049.

Briefly, this Application describes a method for producing nanotubes or nanoparticles, said method comprising;
   a) providing an hydrocarbon liquid as an effective carbon source.
   b) providing energy input, such that said aromatic hydrocarbon liquid produces "synthesis" gases such as acetylene, ethylene, methane or carbon monoxide.

The hydrocarbon liquid also acts as a medium for energy input. The acetylene, ethylene, methane and carbon dioxide produced are effectively transformed into the shortened nanotubes.

Preferably, the energy input can be any of the following:
   electric arcing; resistive heating; laser; electron beam; or any suitable beam of radiation. The energy input has a key-role in triggering and controlling the element cracking of liquid hydrocarbons, providing conditions for optimal production of the synthesis gases and for optional production of the nanotubes.

The hydrocarbon liquid used to produce the sh-MWNTs of the present invention may be any suitable hydrocarbon and may be a mixture of different liquids. For example the liquid may be based on cyclohexane, benzene, toluene, acetone, paraldehyde, methanol, etc or may be a mixture thereof.

Preferably, a DC power supply is used.

Optionally the hydrocarbon liquid is an aromatic hydrocarbon liquid.

Preferably, the aromatic hydrocarbon liquid contains pure aromatics and mixtures of aromatics with other liquid hydrocarbons, for instance, aldehydes, ketones, spirits, Co-Ni-naphtenates based on toluene or spirit solutions or toluene solutions of sulfur (which is considered to be a promoter of the growth of SWNT), etc.

A suitable apparatus for producing nanoparticles and nanotubes is illustrated in FIG. 5. The apparatus comprises a chamber capable of containing a liquid reactant used to produce nanoparticles and nanotubes, said chamber containing at least one electrode of a first polarity and at least one electrode of a second polarity, said first and second electrodes being arranged in proximity to one another and wherein a contactor is fixedly attached to said first electrode.

Preferably, voltage applied across said first and second electrodes may be a direct voltage or an alternating voltage.

Preferably the direct voltage is in the range 10-65 Volts.

Preferably the alternating voltage is in the range 10-65 volts rms.

Preferably the contactor is made from graphite.

Optionally, the contactor is made from any suitable metal including aluminium, titanium, molybdenum and tungsten.

Preferably said contactor is spherical in shape.

Optionally said contactor is hemisherical in shape.

Optionally said contactor may be prismic with triangle or square cross sections, cylindrical or truncated cylindrical or flat.

Figure 6B:
Figure 6C:
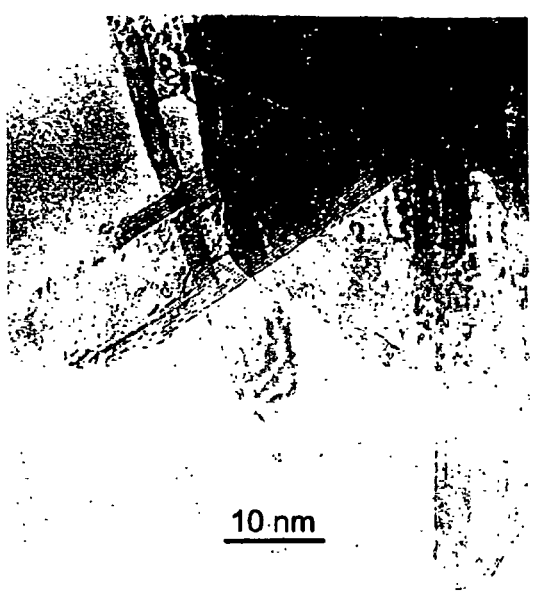
Figure 6A:
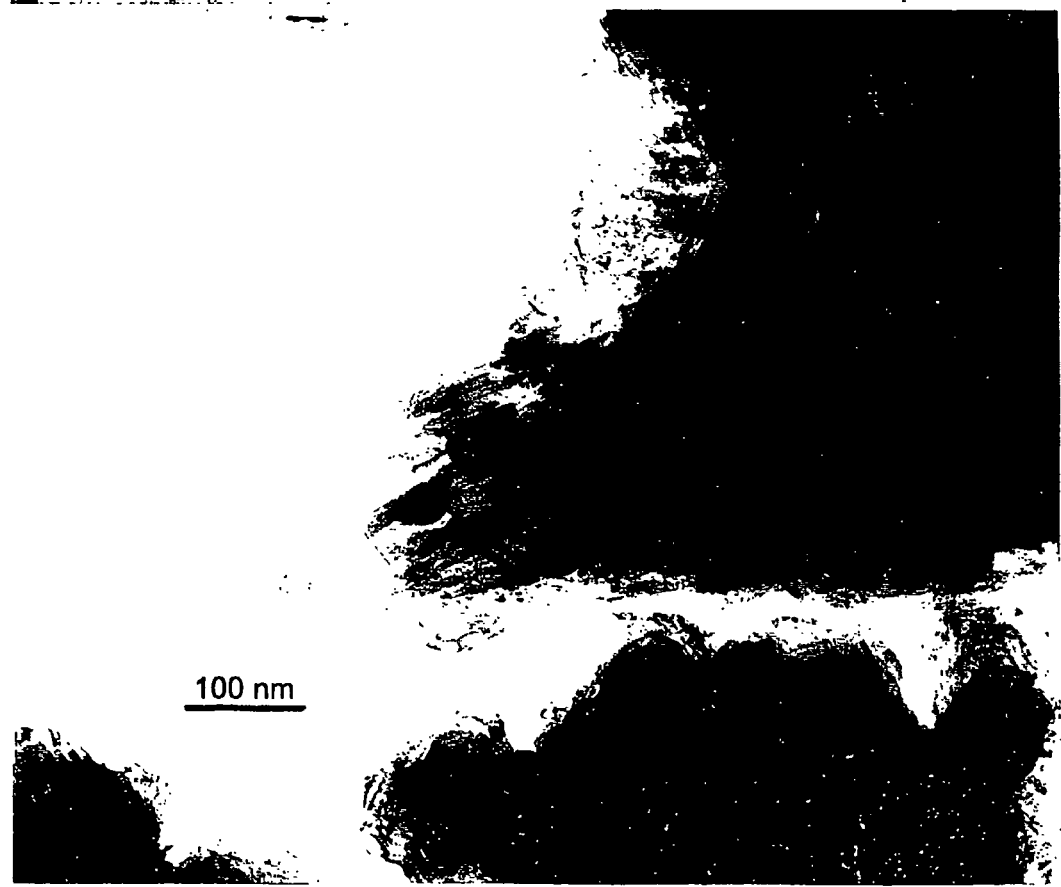

FIG. 6*a-c* show typical TEM images of nanotube deposits produced over Mo anodes at 36V in toluene mixtures

EXAMPLE 1

Figure 1:
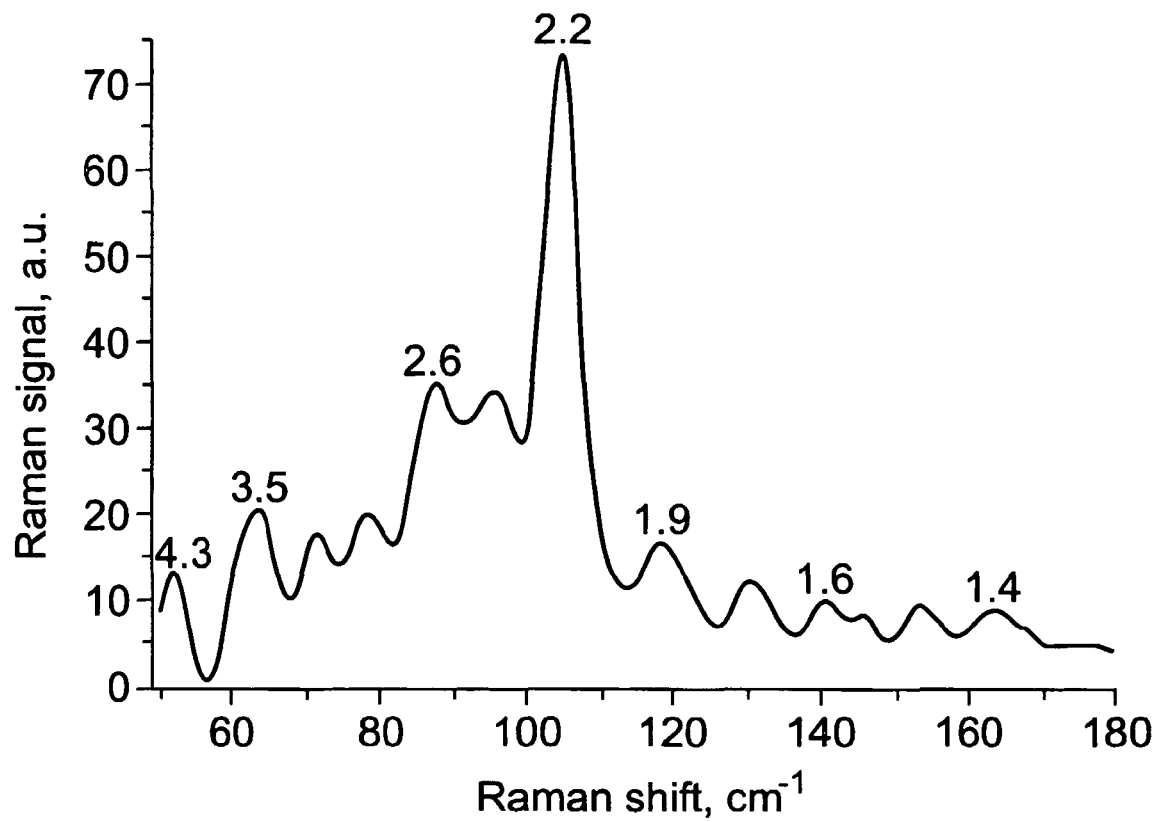
FIG. 1 is a Micro-Raman Spectrum of sh-SWNTs. Figures at the peaks indicate the diameter in nm of the sh-SWNTs.
Figure 2:
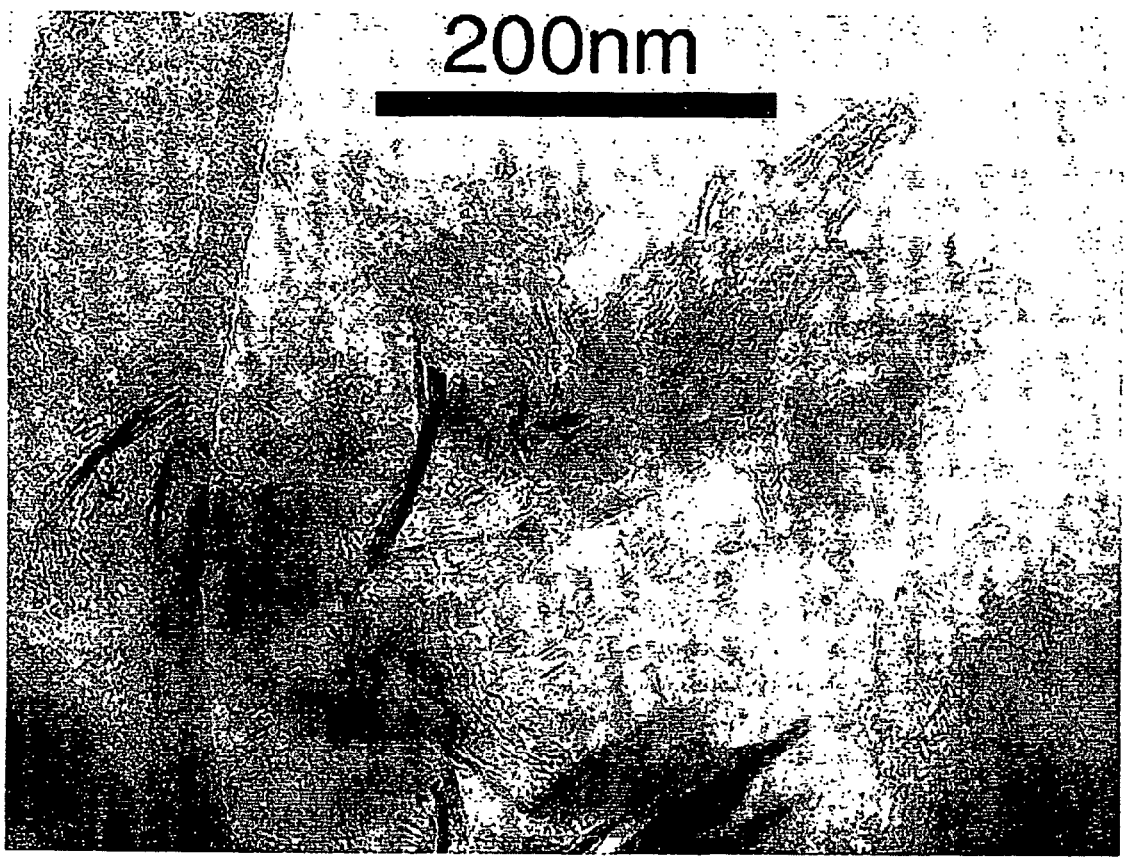
FIG. 2 is a typical TEM image of sh-SWNTs according to the present invention.
Figure 3:
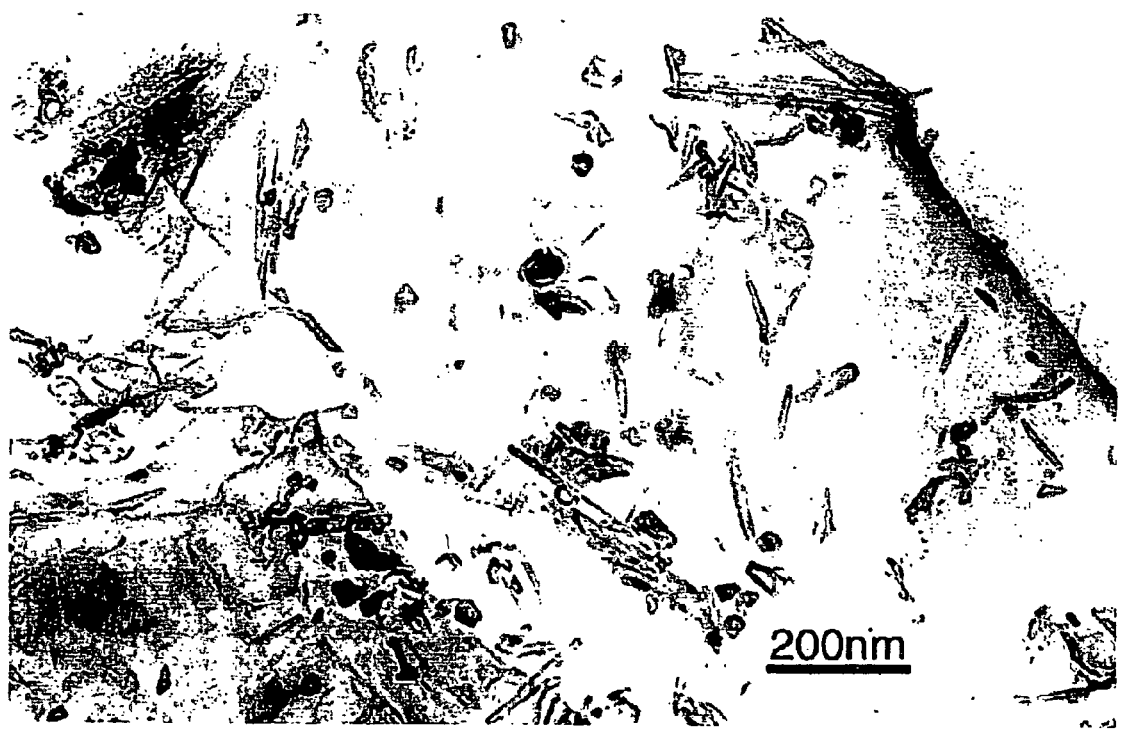
FIG. 3 is a typical TEM image of sh-MWNTs according to the present invention.
Figure 4:
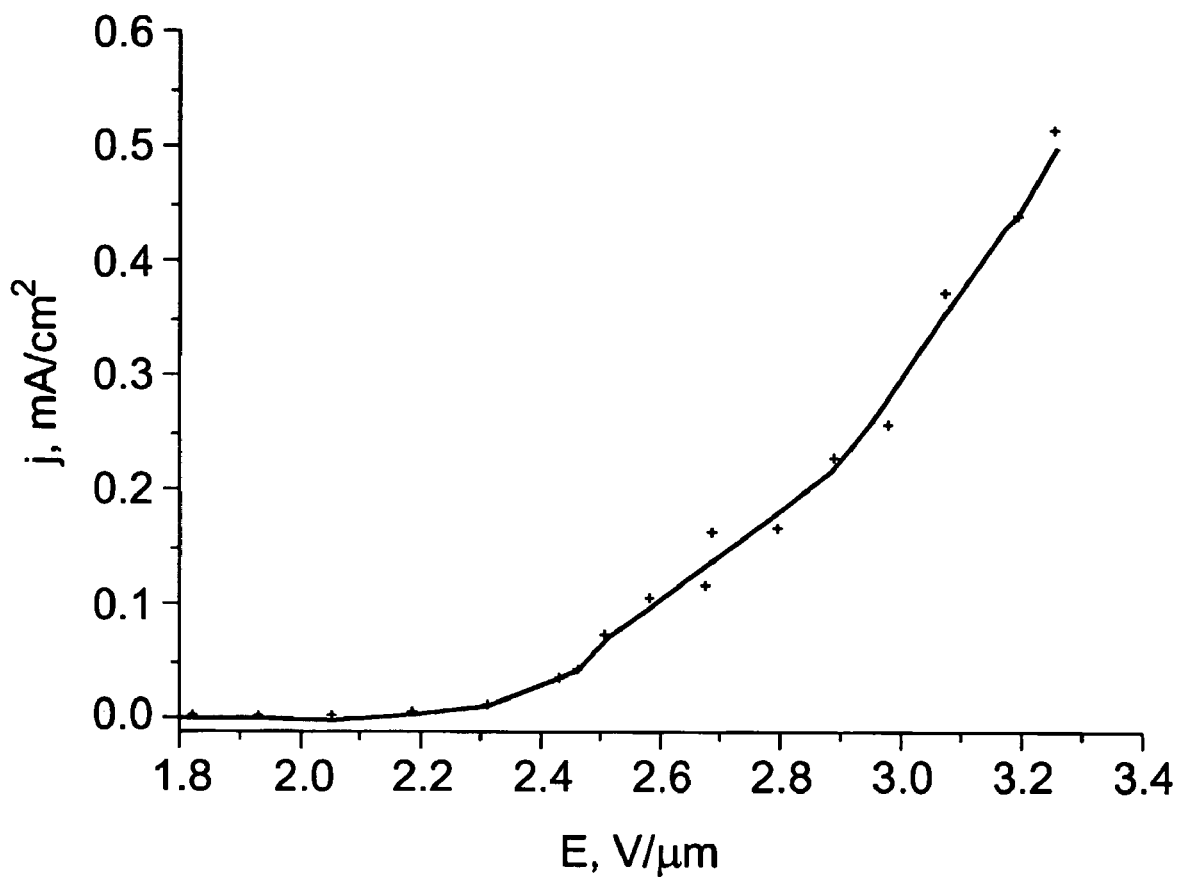
FIG. 4 shows the electron emission from a sh-MWNT powder sample. D=400 µm, T=140 seconds, $1^{st}$ scan.
Figure 5:
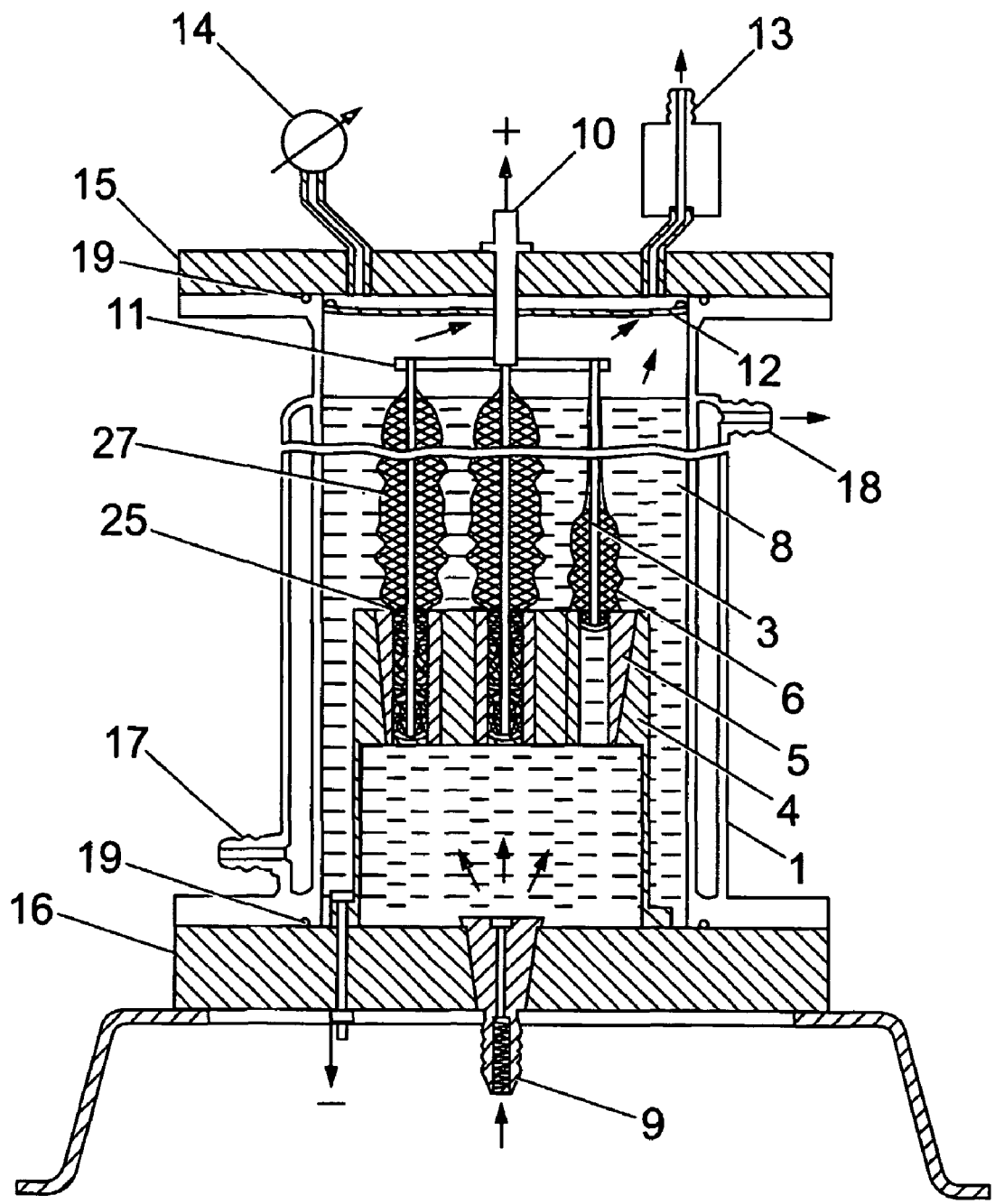
FIG. 5 is a schematic illustration of an apparatus for producing fullerenes carbon nanotubes and nanoparticles according to the present invention.

Producing sh-CNTs/Nanoparticles Using the Apparatus of FIG. 5

The apparatus for producing fullerenes illustrated in FIG. 5 includes a hermetically sealed chamber 1, in which holders 11 of the anodes 3 and a holder 4 of the cathode 5, and fixed to the anodes ends. Spherical or hemispherical graphite contactors 6 are situated below the anodes 3. This arrangement is immersed in a hydrocarbon liquid 8 and is connected to a valve 9 (for adding a buffer gas into the chamber 1 around the electrodes), and to a DC power supply 10 (for instance, normal car batteries).

Tungsten or molybdenum cylindrical rods 3 (anodes) with diameters of 1-4 mm are installed in individual holders 11. Spherical or hemispherical graphite contactors 6 are installed inside vertical cylindrical openings of a matrix 5 (cathode).

FIG. 5 shows a design of the apparatus with 6 anodes vertically aligned in a compact hexagonal package.

In use, the body is filled from the top by a hydrocarbon liquid, like benzene, toluene, acetone, cyclohexane, paraldehyde, etc or their mixtures to a level that is, at least, enough to cover the anodes 3. Whatman filters 12 are installed at the top of the body to adsorb soot particles going from the liquid with bubbles of released gases.

Before the apparatus is switched on, air is pumped out from the body through the outlet valve 13 and pure argon gas is pumped through the valve 9 to the electrodes to fill the empty space to a pressure that is optimal for producing nanotubes. The pressure is controlled by a manometer 14. Top 15 and bottom 16 lids are made of teflon to provide insulation and the possibility of observing arcing during the process. Water cooling the body (and the liquid) is flowing through the inlet 17 to the outlet 18. Rubber rings 19 seal the body.

In a preferred embodiment, Mo or W anodes (with diameters of about 3-4 mm) are hung up inside the matrix's opening from the top lid of the body. Graphite (made as spheres and/or halves of spheres, and/or prisms with triangle or square cross sections, cylinders or truncated cylinders, flat plates, etc) or metallic (for instance, made in a rectangular shape of Ti-sponge or Al cylinders) contactors 6 are attached to the free endings of the anodes closely to a surface of the matrix openings (cathode).

Such geometry provides two opportunities for producing nanotube deposits.

The first one is producing inside the openings when growth of the deposits covers over the anodes 3 from below to the top of the opening (see FIG. 5). The second opportunity is growing outside the openings over the anodes 3. In this case the deposit can grow in two directions: both side-wards and upwards (see FIG. 5), thus, deposits are formed with bigger cross sections and lengths limited only by lengths of the anodes 3.

Both opportunities are realized when free anode 3 endings are placed inside the matrix's openings. If the endings are placed close to the top of the openings just a few of said inside deposit 25 will be produced (see FIG. 5). Said inside 25 and outside 27 deposits can be easily separated from each other. We found that said "inside" producing in benzene or toluene (as well as in any other suitable aromatic liquid) starts at a voltage of about 18 or 19 V. The best voltage for producing sh-MWNTs is within the range 24-36 V with deposit yields of 1.2-1.8 g/min, correspondingly.

One can see that increasing voltage higher than 36V reduces sh-MWNT yields dramatically. We found just traces of sh-MWNTs with voltage of 60V, whereas the most material in TEM pictures appeared as buckyonions, soot and graphite particles and "curly" nanocarbons.

Normally, we used one anode to grow nanocarbon deposits with the apparatus of FIG. 5. Inside 25 and outside 27 deposits were produced in toluene/acetone mixture using one W anode (of 3 mm in diameter). A half of a graphite spherical contactor (diameter of about 12 mm) was attached to a free ending of the anode rod and placed in a top of a graphite matrix's opening (cathode) to start arcing at an applied DC voltage of 30 Volts. At the beginning of the arcing an electric current was about 40 to 60 Amps (producing an "inside" deposit with a yield of about 0.7 g/min) then it was in the range from 20-50 Amps producing an "outside" deposit (with nearly the same yield of 0.5 g/min). Both deposits were easily detached from the electrodes and from each other. The inside 25 and outside 27 deposits (as produced) contains sh-MWNTs=20-40 wt %, polyhedral particles, graphite, "curly" and amorphous nanocarbons and metals (0.5-5 wt %).

An outside deposit of 30 grams per 12 mm (with a yield of 2.5 g/min) was produced with Mo anode (2 rods with diameters of 2.5 mm and lengths of about 10 cm) submerged in a mixture of toluene with Co-and Ni-naphthenates (on a basis of toluene). Co and Ni elemental concentration in said mixture was by about 3% wt. A half of a graphite spherical contactor (diameter of about 12 mm) impregnated with Co and Ni oxides (by 3% wt. by the metals) was attached to free endings of the rods and placed in atop of a graphite matrix's opening (cathode) to start arcing at an applied DC voltage of 36 Volts. At the beginning of the arcing an electric current was in the range 20-30 Amps (producing a small "inside" deposit) then it was varied in the range from 6 to 60 Amps (mean current about of 25 Amps) producing a huge outside deposit 27.

TEM pictures (see FIG. 6*a-c*) of the deposit confirm these findings. FIG. 6*a* shows sh-MWNTs and "curly" nanocarbons over all the area shown. A more detailed look at the SWNTs' clusters reveals sh-SWNTs' lengths and diameters within the range 0.1-1 µm and 2-5 nm, correspondingly.

A High-Resolution TEM picture (FIG. 6*b*) shows that normally sh-MWNTs have one semispherical and one conical end. Oxidising in air at temperatures up to 600° C. for 1-1.5 hours allows opening all spherical ends of MWNTs independently from number of the MWNTs' layers and leaving the conical ends to be intact (see FIG. 6*c*).

EXAMPLE 2

Production of Shortened Single Walled Nanotubes (sh-SWNTs)

To produce the sh-SWNTs as described above, the apparatus of FIG. 5 and the method of described in Example 1 was employed using a Mo 3 mm diameter rod and toluene/Co/Ni-naphtenates (for sh-SWNTs) mixtures as the hydrocarbon liquids. A DC voltage of 24 Volts (3 pairs of normal car batteries connected in parallel) was applied to provide an arc current of 20-40 Amps. A narrow carbonaceous deposit (of about 15 g) was grown over a Mo rod for about 10 min. The deposit mostly contained "curly" nanocarbon forms including shorten GNFs (lengths were less than 1 micron) and the sh-SWNTs (of about 1% wt).

The invention claimed is:

1. Nanotubes comprising of short multi-walled nanotubes (sh-MWNTs) formed from concentrically arranged nanotube layers having a mean outer diameter of from 2 to 15 nm, a median outer diameter of 6 to 8 nm and a natural length of 100 to 500 nm.

2. The nanotubes according to claim 1, wherein the short multi-walled nanotubes (sh-MWNTs) are constructed from 2 to 15 co-axial layers of single walled nanotubes.

3. The nanotubes according to claim 2, wherein each nanotube of the short multi-walled nanotubes (sh-MWNTs) have one semispherical end and one conical end.

4. The nanotubes according to claim 2, wherein the short multi-walled nanotubes (sh-MWNTs) are able to start Field Electron Emissions at about 2V/micron as a powder sample.

5. The nanotubes according to claim 1, wherein each nanotube of the short multi-walled nanotubes (sh-MWNTs) have one semispherical end and one conical end.

6. The nanotubes according to claim 5, wherein the semispherical end of each of the short multi-walled nanotubes (sh-MWNTs) can be selectively opened by oxidation leaving the conical end intact.

7. The nanotubes according to claim 6, wherein the short multi-walled nanotubes (sh-MWNTs) are able to start Field Electron Emissions at about 2V/micron as a powder sample.

8. The nanotubes according to claim 5, wherein the short multi-walled nanotubes (sh-MWNTs) are able to start Field Electron Emissions at about 2V/micron as a powder sample.

9. The nanotubes according to claim 1, wherein the short multi-walled nanotubes (sh-MWNTs) are able to start Field Electron Emissions at about 2V/micron as a powder sample.

* * * * *